(No Model.)

I. LA R. JOHNSON.
ELECTRIC SUBWAY.

No. 412,095.    Patented Oct. 1, 1889.

Witnesses.
Wm. H. Bates.
Jno. O'Connell,

Inventor.
Isaac LaRue Johnson (No Model.) 2 Sheets—Sheet 2.

I. LA R. JOHNSON.
ELECTRIC SUBWAY.

No. 412,095. Patented Oct. 1, 1889.

UNITED STATES PATENT OFFICE.

ISAAC LA RUE JOHNSON, OF WASHINGTON, DISTRICT OF COLUMBIA, ASSIGNOR OF ONE-HALF TO OLIVER T. THOMPSON, OF SAME PLACE.

ELECTRIC SUBWAY.

SPECIFICATION forming part of Letters Patent No. 412,095, dated October 1, 1889.

Application filed July 23, 1889. Serial No. 318,422. (No model.)

*To all whom it may concern:*

Be it known that I, ISAAC LA RUE JOHNSON, of Washington, in the District of Columbia, have invented certain new and useful Improvements in Conduits for Electrical Service; and I do hereby declare the following to be a clear, full, and exact description of the same, reference being had to the accompanying drawings, forming a part of this specification, and to the figures and letters of reference marked thereon.

My present improvement relates to a conduit in which an interior shell or lining is provided, having shelves or brackets for the support of cables or conductors simply, and having lugs or bosses on the rear sides of such shells or linings which serve as offsets to provide an air-space between the outer and inner walls of the said parts; and it further consists of details of construction which will be more fully herein set forth.

Figure 1:
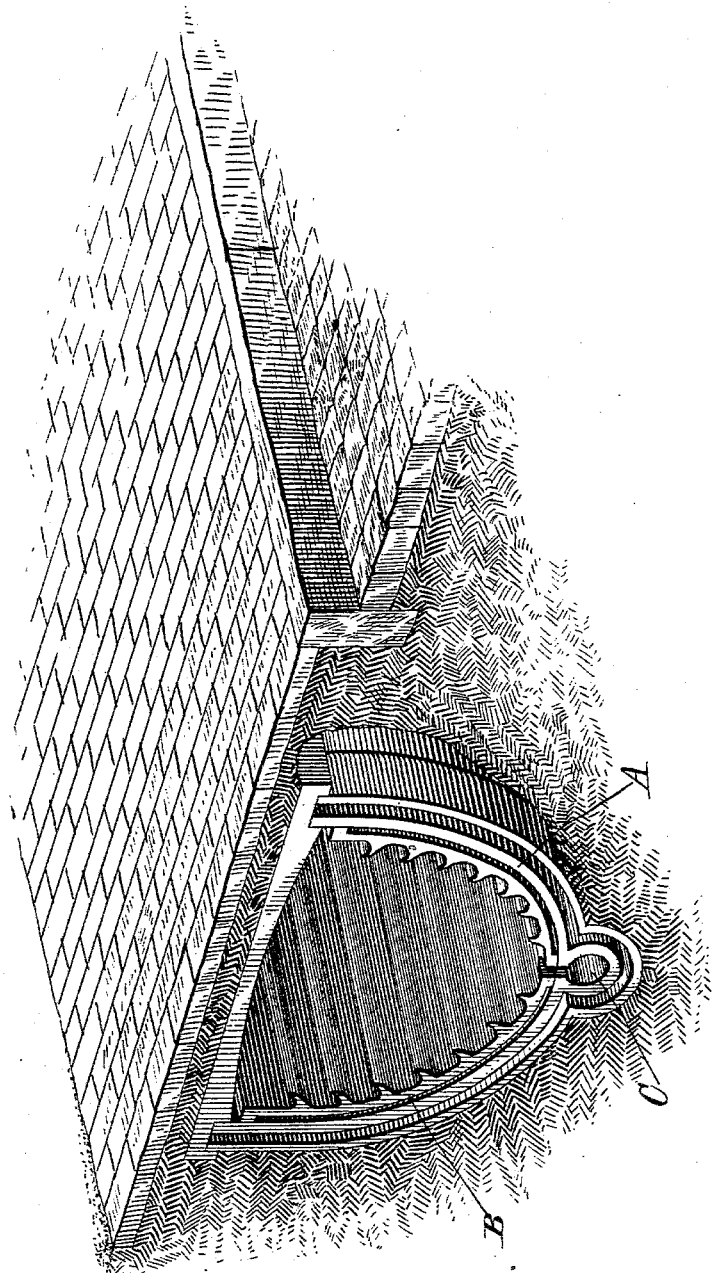
Figure 2:
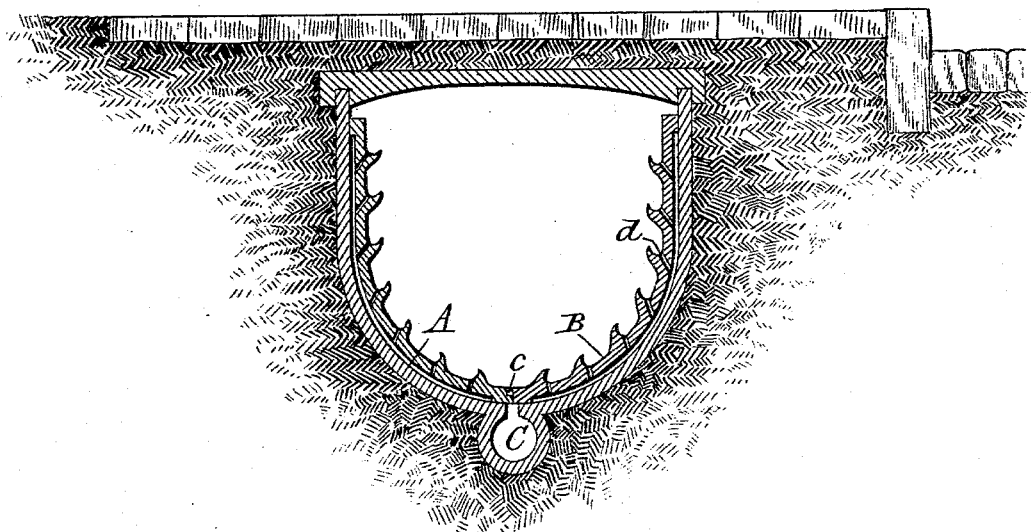
Figure 3:
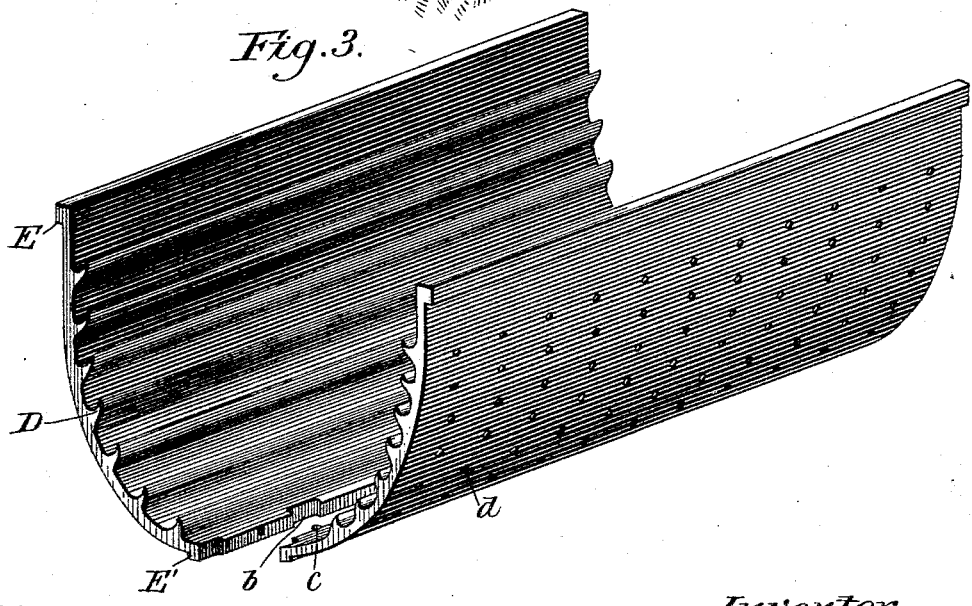

Referring to the drawings which form a part of this specification, Figure 1 is a perspective view of my improved conduit. Fig. 2 is a sectional elevation of the same, and Fig. 3 is a perspective view of the cable-supporting plates or linings.

A represents the main or outer shell or wall of the conduit; B, the inner bracket bearing lining or shell; and C is an auxiliary drain-pipe connected to said outer shell in any approved manner, or it may be integral therewith. The bracket-lining is designed to support conductors separately or in cables, which may be inserted in the conduit in any desired manner. It is made to conform to the outline of the outer wall of the conduit in which it may be employed, and has lugs or bosses, as shown at E and E', which serve as bearings to maintain it from direct flat contact with the conduit. This arrangement affords an air-space between the two parts, and is of decided advantage for many reasons, among which it may be stated that as this lining is not to be restricted to any one material in its manufacture it may be made of indurated fiber, papier-maché, or other hardened water-repellent substance, or it may be of terra-cotta, or iron, and therefore it is very necessary that the shell and everything connected with it should present as much surface as possible to the air-currents that are to be circulated through the conduit for the purpose of drying the conduit and its contents, and also for expelling gases therefrom.

The shells are provided at their meeting edges with dowels, as shown at c, which enter openings registering therewith in the opposite sections to prevent the dislodgment of the parts by accident. Recesses or openings are also provided at these meeting edges for the passage of water to the drain-pipe, and for ventilation.

At d perforations are shown through which water that may collect on the shelves or brackets by leakage or condensation may pass to the rear of the shell or lining and thence to the drain-pipe C.

The materials enumerated above may be perforated, as shown, or any foraminous material may be used, the object to be attained being to keep the cables as free from dampness as possible, and this cannot be accomplished in tubes in which the moisture must collect at their lowest point, which is beneath the cable and from which their disintegration begins. The inner and outer walls of the entire structure are made approximately semi-tubular, so as to afford the best results in drainage, and it is designed more especially for service just beneath sidewalks; and after the trunk is laid cables and conductors may be placed on the brackets and the cover applied, and this without the slightest injury to the insulating material of the cables, which so commonly results in the usual "draining systems."

Having thus described my invention, what I claim as new, and desire to secure by Letters Patent, is—

1. A conduit for electrical cables and conductors, having a water-repellent non-contacting lining or shell therein which conforms to the outline of said conduit and having brackets thereon for the support of said cables and conductors, substantially as described.

2. A conduit for electric cables and conductors, having a water-repellent non-contacting bracket bearing shell or lining therein, formed of perforated or foraminous material to prevent the collection of moisture beneath the cables, and conductors located on the brackets, substantially as described.

3. A conduit for electrical cables and conductors, having a water-repellent non-contacting lining or shell therein, said lining being divided longitudinally and having dowels and openings for engagement to prevent accidental separation of the sections, substantially as described.

4. In a conduit approximately semi-tubular in form and having an auxiliary drain-pipe, the combination of a water-repellent non-contacting lining or shell therein, longitudinally separable, and having at the meeting edges dowels and orifices for engaging said edges and openings along said edges for the exit of water, substantially as described.

ISAAC LA RUE JOHNSON.

Witnesses:
WM. H. HAYWARD,
JOHN A. HAYWARD.